Sept. 2, 1924.　　　　　　　　　　　　　　　　　　　　　　1,506,986
J. E. MILLER
SPRING WHEEL
Filed May 14, 1923
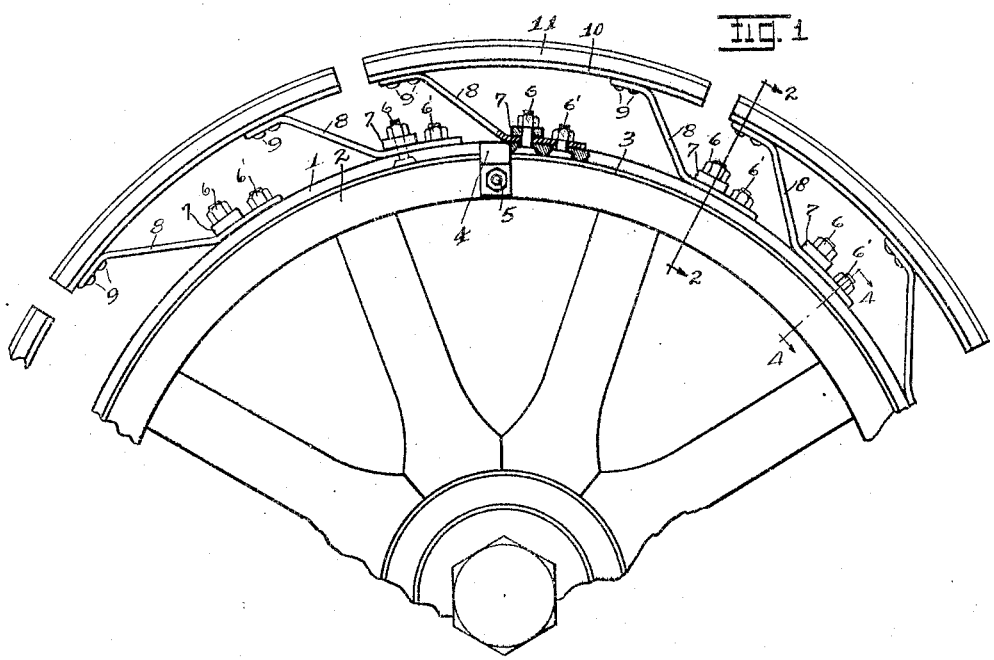
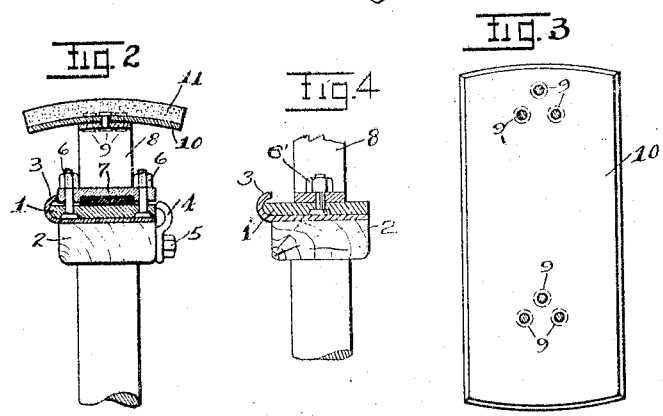
Inventor
JOHN E MILLER
By C. D. Enochs
Attorney Patented Sept. 2, 1924.

1,506,986

UNITED STATES PATENT OFFICE.

JOHN E. MILLER, OF FORMAN, NORTH DAKOTA.

SPRING WHEEL.

Application filed May 14, 1923. Serial No. 638,873.

*To all whom it may concern:*

Be it known that I, JOHN E. MILLER, a citizen of the United States, and a resident of Forman, in the county of Sargent and State of North Dakota, have invented certain new and useful Improvements in Spring Wheels, of which the following is a specification.

One object of my invention is to provide in a spring tire a plurality of tread plates for direct contact with the ground.

Another object is to provide spring means for mounting the tread plates to a ring in turn mounted directly on the wheel felly rim.

Another object is to provide improved means connecting the tread plates and the wheel so as to give the most advantageous spring action.

Another object is to provide improved means for attaching the springs to the ring.

Another object is to provide improved means for attaching the complete assembly of the ring and tread plates to the wheel felly rim.

With these and incidental objects in view, the invention consists of certain novel features of construction and combination of parts, the essential elements of which are hereinafter described with reference to the drawing which accompanies and forms a part of this application.

In the drawing, Figure 1 is a fragmentary side elevation of an automobile wheel embodying my invention; Figure 2 is a section taken on the line 2—2, Figure 1; and Figure 3 is an inside view of one of the tread plates with the springs removed. Figure 4 is a section taken on the line 4—4, of Figure 1.

As shown in Figures 1 and 2, the ring 1 is mounted on the rim 3 on the felly 2 and is so designed that it may shoulder against the out-turned curved flange of the rim 3 now used on many standard wheels, and this ring 1 is clamped thereto by clips 4 and bolts 5 in the ordinary manner.

Bolts 6 fasten the clip 7 firmly to the ring 1 and hold thereto the springs 8 which are also held by the bolt 6' and riveted at their opposite end by three rivets 9. The tread plates 10 are curved as better shown in Figure 2 and are covered with a rubber facing 11. The springs 8 are substantially parallel to each other about the wheel and I prefer to use two of these springs to each tread plate, as by this construction the tread plate can swing inwardly toward the ring 1 and maintain a concentric position therewith or either end may tip independently of the other, as required by road conditions.

With my improved construction I have a demountable spring tire that can be taken off as quickly as the ordinary demountable rim and also it is a very simple matter to replace any individual tread plate should one of the springs become broken or should the facing be worn off.

The construction provided gives a sufficient resiliency for either truck or automobile and at the same time is steady and noiseless.

While I have described my invention and illustrated it in one particular design, I do not wish it to be understood that I limit myself to this construction, as it is evident the application of the invention may be varied in many ways within the scope of the following claims.

Claims:

1. A tread plate for a spring wheel curved in both directions and attached to the wheel through two substantially parallel cantilever springs.

2. A spring wheel comprising in combination a ring adapted to be mounted on the felly rim of a wheel, a plurality of tread plates for said ring, and two substantially parallel cantilever springs, connecting each of said tread plates with said ring.

3. In a spring wheel the combination with a ring adapted to be mounted on the felly rim of a wheel, of a plurality of tread plates for said ring, a pair of substantially parallel springs riveted one near each end of each of said tread plates, and spring clips on said ring adapted to hold the inner ends of said springs.

JOHN E. MILLER.